June 6, 1967

J. C. HOWARD 3,323,429

PHOTOGRAPHIC APPARATUS

Filed May 8, 1964

Inventor.
John C. Howard.
By Zabel, Baker, York, Jones & Dithmar
Attorneys.

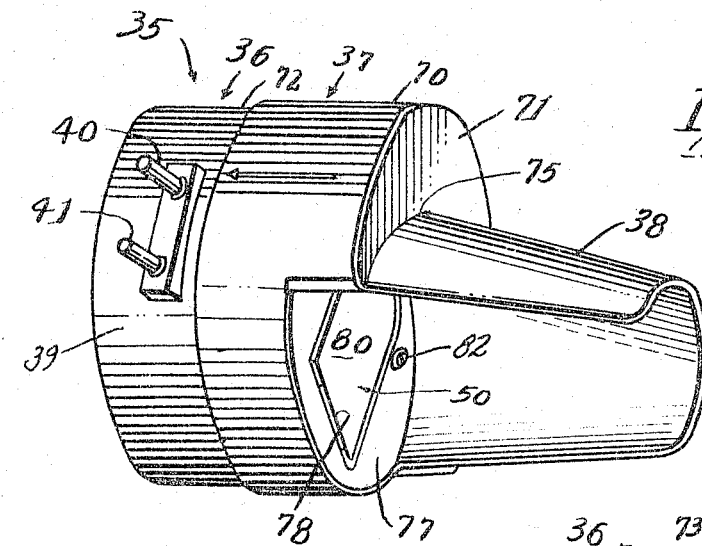
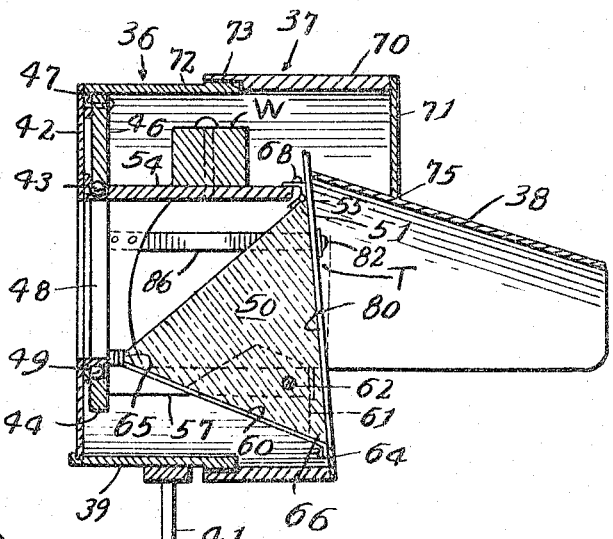
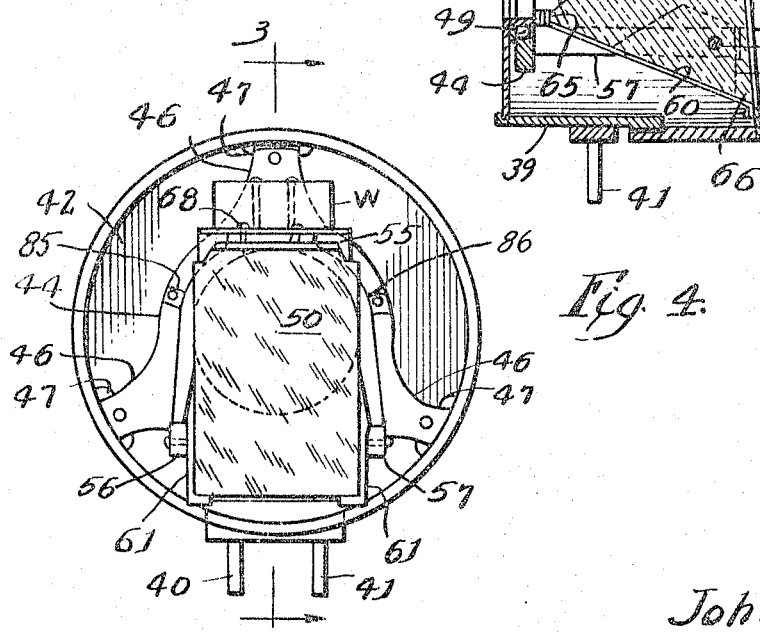

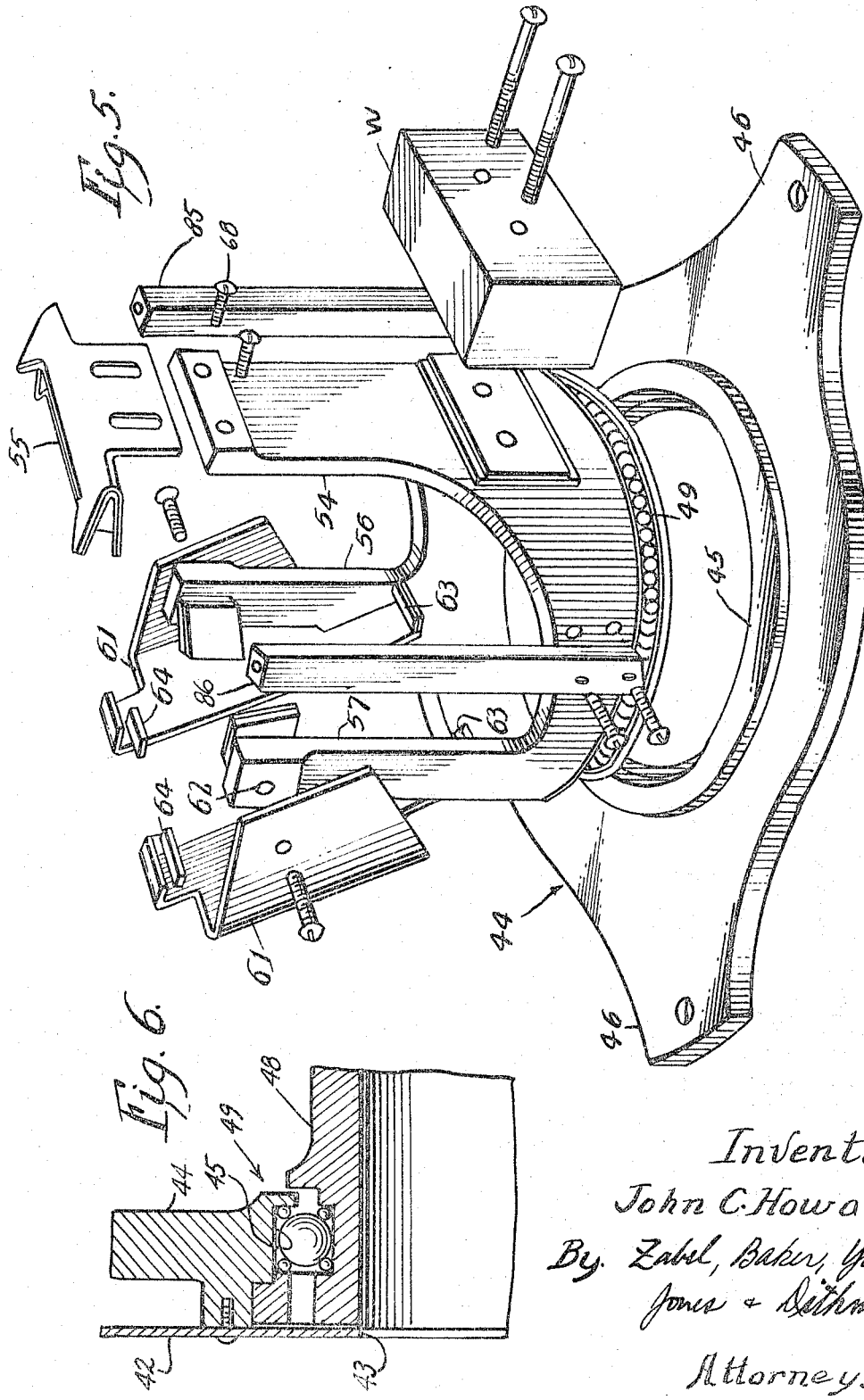

3,323,429
PHOTOGRAPHIC APPARATUS
John C. Howard, 5906 N. Knox Ave.,
Chicago, Ill. 60630
Filed May 8, 1964, Ser. No. 365,984
8 Claims. (Cl. 95—1)

This invention relates to a photographic apparatus and method that enables artists to create colored photographs embodying controlled chromatic and representational characteristics of an object. The resultant photographs are regarded as a significantly new art form by artists and others who have seen examples.

The apparatus and method of the invention produce enhanced colored photographs that present the image of an object in unusual aspects, compared with conventional colored photographs. The photographs possess colorations different from those of the object itself, and, at the will of the artist may have representational qualities of substantial realism, abstraction, or surrealism.

One object of the invention is to provide photographic apparatus and method capable of producing colored photographs, still or moving, of the type described generally above. These photographs may take the form of transparent motion picture film, prints processed from motion picture film, still picture transparencies, or still picture prints.

Another object is to provide apparatus and method whereby the characteristics or attributes of the photograph are subject to variation and control, the precise photograph in a given instance being a composite result of the apparatus, method and creativeness of the artist.

Still another object is to provide apparatus and method whereby the chromatic characteristics of a recorded image are subject to wide latitude and thus responsive to the skill and creativeness of the artist. The chromatic characteristics are varied by such factors as specific elements used in the optical system, the angular orientation and adjustment of such elements, focal length, the type of light source used, the use of light interference technique or pigmented filters, the lens to object distance and type of color film used, to name a few.

A further object is to provide apparatus and method for creating the aforesaid color photographs that are further characterized by controlled distortions of the representational visual characteristics of an object. The recorded image, for example, may be out of focus, or elongated or compressed, or a combination of both, thereby imparting qualities of abstraction or surrealism in addition to the enhanced chromatic qualities.

The invention employs a still or motion picture camera of conventional type suitably mounted for universal movement. The camera includes an object lens, preferably a lens of the zoom type, and contains color film of the indoor or outdoor type. A prism of glass or other suitable refracting and dispersive material is mounted in effective relation with the object lens. The prism is adjustable longitudinally along the optic axis of the lens, and rotatable on such axis as well as on an axis normal thereto. A non-reflecting shade is disposed forwardly and laterally of the prism and adjustable therewith, the shade being effective to exclude from the prism light totally reflectable by the prism while admitting light for refraction and direction to the object lens.

The camera and prism are positioned at selected distance from, and directed optically toward, an object. Light, which may be heterochromatic, natural light or artificial light of selected lesser color content, that is reflected from the object enters the prism, and is refracted and directed into the object lens. Some of this light, depending on the angular orientation of the prism on the optic axis of the lens and the character of the object, is dispersed into spectrums, or parts thereof, that are recorded on the color film. Such spectrums, of course, provide the enhanced chromatic qualities that characterize the photographs produced by the apparatus and method of the invention.

In general, only light from portions of the object that possess pronounced color or tonal differences, such, for example, as lines or masses defining light portions on a dark background, produces recordable spectral separation. Thus, the color spectrums in the recorded image bear relation to some of the realistic features of the object, while other of the realistic features are recorded by light that is not dispersed noticeably.

By way of further explanation, it is assumed that an object is characterized by horizontal and vertical lines defined by regions of chromatic or tonal differences. It further will be assumed that the prism is oriented angularly in such position that the edge defined by the apex angle is horizontal and uppermost. In the recorded image of a positive photograph the horizontal lines, and regions immediately above and below, appear in spectral or rainbow fashion, the pronounced red ends of the spectrums being uppermost, referred to the corresponding part of the object. If the prism is rotated 180 degrees on the optic axis, the image is generally the same except that the red end of the spectrum is lowermost in each spectral separation. In either case, the horizontal lines in the image show in spectral colors, while the vertical lines have a more or less natural or real appearance. For convenience, the effect produced by this orientation of the prism may be termed "horizontal dispersion."

If the prism is oriented angularly in such position that the edge of the apex angle is vertical and at the left, looking toward the lens, the vertical lines in the recorded image will appear in spectral or rainbow fashion with the red end of the spectrum at the left. Conversely, if the prism is rotated 180 degrees, the image is generally the same except that the red ends of the spectrums are at the right. In both cases the horizontal lines are essentially realistic. The effect of this prism orientation may be termed "vertical dispersion."

It is apparent that orientation of the prism at intermediate angular positions will produce correspondingly different chromatic and representational effects, each contributing to the versatility of the apparatus and method.

The foregoing indicates some of the controls that contribute to the chromatic characteristics of the resultant image. Other controls are provided by varying lens to object distance, lens focus, lens focal length (variable with zoom lenses), specific light source, light interference techniques or pigmented filters and type of color film.

Representational characteristics of the resultant image additionally are controlled and distorted by rotating the prism through small angle on an axis generally normal to the optic axis of the lens. Such adjustment, depending on direction of rotation, expands or compresses the image in direction on the film at right angles to the projection thereon of the prism edge defined by the prism angle. This distortion may be enhanced by defocusing the object lens, resulting in loss of perspective, among other creative effects.

The enhanced chromatic and distorted representational characteristics made possible by the invention enable the artist to create and discover new aspects of reality by destroying familiar relationships in favor of controlled new ones, thereby providing a significantly new art form useful for instruction and enjoyable to view.

Other objects, advantages and details of the invention will be apparent as the description proceeds, reference being had to the accompanying drawings wherein one form of the apparatus invention is shown. It is to be understood that the description and drawings are illustrative only, and that the scope of the invention is to be measured by the appended claims.

In the drawings:

FIG. 2 is a perspective view of an assembly including prism mount, prism and shade.

FIG. 3 is a somewhat diagrammatic longitudinal sectional view of the assembly shown in FIG. 2 and FIG. 4, the view taken on line 3—3 of FIG. 4.

FIG. 4 is a front elevational view of the assembly shown in FIG. 3, the shade removed for clarity.

FIG. 5 is an enlarged exploded perspective view showing details of a portion of the prism mount.

FIG. 6 is an enlarged sectional view showing further details of the illustrated prism mount.

Figure 1:
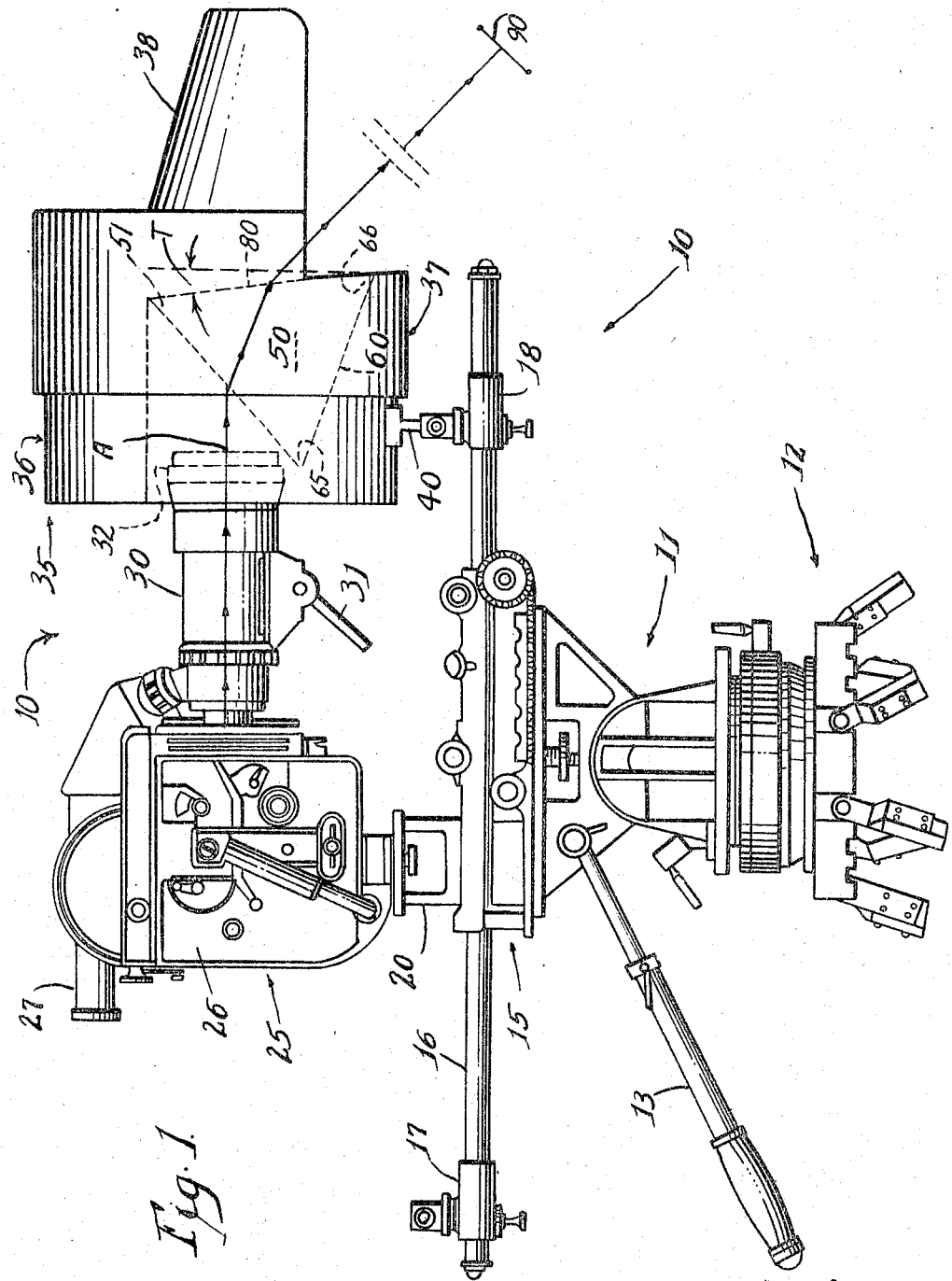
FIG. 1 is an elevational view of photographic apparatus embodying the invention, the camera shown being a motion picture camera having an object lens of the zoom (variable focal length) type.

Referring first to FIG. 1, photographic apparatus embodying the invention, generally designated 10, is suitably mounted for more or less universal movement, as for example on head 11 of a conventional tripod 12. A handle for controlling the movement of tripod head 11 is shown at 13.

Apparatus 10 includes a support 15 mounted on tripod head 11, support 15 having various adjustable elements for mounting the other components of the apparatus. Bar 16 is one of a pair of laterally spaced, longitudinally movable bars that carry adjustable holders 17 (not used in the illustrated apparatus) and 18 at opposite ends. Support 15 also includes one or more base members 20 that condition the apparatus to accommodate cameras of different types.

The illustrated apparatus uses a motion picture camera 25 having a film and mechanism compartment 26, view finder 27 and an object lens 30 of the zoom type, the focal length of which is adjusted by lever 31. The forward or free end of lens 30 is designated 32. Camera 25 is mounted on base member 20 of support 15, as shown in FIG. 1.

In one commercial form of the invention object lens 30 is a "Pan-Cinor" zoom lens sold by Som Berthiot, Paris, France. The front element of this lens has a diameter of 2 1/16 inches, and the focal length of the lens is variable between 17 mm. and 85 mm. The shortest useful focal length may be limited by prism size, and in the commercial form mentioned is about 26 mm. However, the focal length of the lens can be decreased to the limit of the lens by using a prism of suitable size.

An assembly, generally designated 35, is mounted on adjustable holder 18 in effective relation with object lens 30. Assembly 35 includes a cup shaped stationary component 36, a movable component 37 and a shade 38 more or less integral with movable component 37. Parts of movable component 37 cooperate with shade 38 in performing the function of the latter, as will be seen.

Stationary component 36 of assembly 35 includes a tubular portion 39 having mounting prongs 40 and 41 (FIGS. 2 and 4) that are received in adjustable holder 18, as best shown in FIG. 1. Thus, stationary component 36 has fixed relation with object lens 30, except insofar as the relationship is subject to adjustment by holder 18 itself. The latter provides vertical and axial adjustments so stationary member 36 may have effective relation with object lens 30.

End plate 42 (FIGS. 3 and 4) of stationary component 36 has a central opening 43 that is aligned with the optic axis A (FIG. 1) of object lens 30, and, in fact, receives the forward end 32 of the lens, as shown in FIG. 1.

A spider member 44 (FIGS. 3, 4 and 5) having a central opening 45 (FIG. 5) coaxial with opening 43 is mounted inwardly of end plate 42. Arms 46 of spider member 44 are suitably attached to spaced lugs 47 at the juncture of tubular portion 39 and end plate 42 of stationary component 36.

Movable component 37 in the form of the invention shown includes an irregular annular member 48, best shown in FIG. 5, that is mounted for rotation on spider member 44 of stationary component 36 in coaxial relation with openings 43 and 45. A ball bearing arrangement 49, shown in detail in FIG. 6, both connects the stationary and movable components together and provides low friction rotation for the latter through 360 degrees.

A counterweight W may be mounted on annular member 48 to compensate for the weight of other eccentric members forming part of movable component 37.

Other arrangements connecting the stationary and movable components are possible, it being necessary, in one form of the assembly, only to provide a connection between the components at angular orientations separated by 90 degrees.

A prism 50 of glass or other suitable refracting and dispersive material is mounted on annular member 48 of movable component 37. Prism 50 preferably has a comparatively high refractive index, reasonable dispersive power and an apex angle 51 (FIGS. 1 and 3) of the order of 50–70 degrees. Applicant has used prisms in commercial apparatus with prism angles falling in the 50–60 degree range, and knows that they produce successful results. He has experimented with prism angles in the 60–70 degree range, and has found that such prisms also produce successful results. Prisms with smaller and larger angles, generally speaking, provide ineffective refraction and dispersion, as far as applicant's purposes are concerned.

Annular member 48 has cut-away sides, except for the elongated portion 54 shown in FIGS. 3 and 5 that carries counterweight W, and post portions 56 and 57. Elongated portion 54 is provided with holder 55 that cradles the apex angle portion of prism 50.

Base 60 of prism 50 is embraced by a two-part bracket 61 (FIGS. 4 and 5) that is pivoted at 62 to the ends of post portions 56 and 57. Rubber pads 63 and 64 (FIGS. 3 and 5) on bracket 61 cradle the prism corners at base angles 65 and 66 (FIG. 3) of prism 50. The structure just described mounts prism 50 securely on annular member 48 which is part of movable component 37, as previously described.

Holder 55 for the apex angle portion of prism 50 is adjustable longitudinally of elongated portion 54. Set screw means 68 is provided for this adjustment. Thus, prism 50 may be rotated as desired on pivots 62, the pivots defining an axis generally normal to the optic axis A of object lens 30. The purpose for this adjustment will be described later.

Movable component 37, as previously mentioned includes portions that function as a shade for prism 50. These portions are designated 70 and 71 in FIGS. 2 and 3. Portion 70 loosely telescopes an aligned portion 72 of stationary component 36, the joint 73 between the two portions serving to exclude light and permit relative rotation.

Portion 71 is shaped to embrace the somewhat semi-circular exterior of shade 38, portion 71 being connected to shade 38 in light-tight manner at 75. The shape of shade 38 in relation to prism 50 is such as to mask the prism from light that is totally reflectable by the prism while admitting light for refraction, dispersion and direction to object lens 30.

As best shown in FIG. 2, shade 38 includes an inner circular portion 77 having a generally rectangular aperture 78. The forward face 80 of prism 50 is aligned with this aperture 78. Thus, only prism face 80 is exposed to outside light, and the adjacent shade portions shield face 80 from light from such directions that the light would be totally reflected within the prism.

In the illustrated form of the invention, shade 38 and integral cooperating shielding portions 70, 71 and 77 are mounted in fixed relation with prism 50 by means of screw means 82 extending through circular portion 77 into engagement with arms 85 and 86 (FIGS. 4 and 5) of annular member 48. These arms may be separate pieces secured to member 48, as shown, or integral with the member.

Completing the description of the apparatus, prism 50 is of a size that is correlated with the focal length of object lens 30 and the diameter of the front element of the lens. It is desirable, of course, that prism 50 be large enough in size to cover the full view field of lens 30 for any focal length used.

In the commercial apparatus referred to previously, lens 30 is a "Pan-Cinor" zoom lens having focal length variable between 17 and 85 mm. and front element diameter of 2 1/16 inches. Prism 50 used with this lens has a prism angle 51 of 54 degrees, a length of forward prism face 80 between angles 51 and 66 of 3 3/4 inches and a width of this prism face from end to end between post portions 56 and 57 of 2 5/8 inches. This prism size imposes a lower limit of about 26 mm. on the focal length of lens 30.

It will be noted in FIGS. 1 and 3 that front prism face 80 is shown inclined or tilted at a counterclockwise angle T with a plane normal to optic axis A of lens 30. In the figures, the plane is a vertical plane. Experience indicates that with a prism angle of 54 degrees, the counterclockwise angle T should be about 6 degrees to provide a substantially undistorted image in the film plane. The angle T for an undistorted image is a function of the prism angle, and is about zero degrees for a 60 degree prism angle. A prism angle in excess of 60 degrees requires the angle T to be clockwise with respect to the plane normal to the optic axis if distortion is to be avoided.

When the artist desires to introduce intentional distortion, prism 50 is tilted on the axis defined by pivots 62 to angles, counterclockwise or clockwise, other than those mentioned above for an undistorted image. If the prism edge defined by apex angle 51 is horizontal, a tilt in one direction causes the picture to be compressed in vertical dimension, while a tilt in the opposite direction causes the picture to expand vertically, the amount of distortion being a function of the adjustment of angle T. This adjustment is made with screw means 68 which permits longitudinal movement of holder 55, as previously described. Corresponding distortion in horizontal dimension occurs when the apex prism edge is vertical and tilt angle T is adjusted.

The foregoing substantially completes the description of exemplary apparatus embodying the invention. The following will describe various aspects involved in using the apparatus and practicing the method of the invention.

In practice, the artist chooses as between indoor or outdoor color film, depending on the related characteristics desired in the final picture. He also determines desired illumination as between heterochromatic natural, or light from one or more sources having lesser color content. Choice also is made as to the use of pigmented filters or light interference techniques between object and film if it is desired to suppress or eliminate certain chromatic components of the selected illumination.

Attention next is given to the magnitude or width of the desired spectral separations in the final photograph. Generally speaking, with a prism of given index of refraction, dispersive power and prism angle, the magnitude or width of the spectral separation on the film plane increases both with lens to object distance and with focal length. Therefore, lens to object distance and focal length are chosen in accordance with desired width of spectral separation. With a zoom lens, focal length merely is a matter of adjustment. If conventional lenses are used, the one of selected focal length must be mounted in the camera.

The lens then is directed at an object 90 (FIG. 1) and adjusted for range, either bringing the image of object 90 into sharp focus on the film plane or into a condition of defocus, depending on whether or not the representational characteristics of the picture are to be realistic.

Finally, prism 50 is moved adjacent end 32 of lens 30, as shown in FIG. 1, so that all light entering lens 30 passes through the prism.

Thereafter, the camera is actuated in conventional manner to record either motion or still colored photographs having the controlled chromatic and representational characteristics produced jointly by the apparatus, method and creativeness of the artist.

The present apparatus and method, contrary to convention, make positive use of chromatic aberration, distortion and lens focus as variables to produce colored photographs having controlled chromatic and representational characteristics. These photographs truly constitute a new art form.

From the foregoing, it is thought that the construction, method steps and advantages of the invention will be readily apparent to those skilled in the art. Various changes in detail may be made without departing from the spirit or losing the advantages of the invention.

Having thus described the invention, what I claim as new and desire to secure by Letters Patent is:

1. Photographic apparatus for creating colored photographs embodying controlled chromatic and representational characteristics of an object comprising:
   a support;
   means mounting said support for universal movement;
   a camera including an object lens secured to said support;
   a stationary component having an opening therein mounted on said support and receiving the forward end of said lens, the axis of said lens generally coaxial with said opening;
   a movable component mounted for 360 degree rotation on said stationary component;
   a prism of comparatively high refractive index having an apex angle of the order of 50–70 degrees mounted adjacent said lens on said movable component in line with the opening in said stationary component, the axis of said lens intersecting one prism face in the central region thereof, the other prism face at an angle of the order of 0–10 degrees with a plane normal to the axis of said lens; and
   a shade disposed forwardly and laterally of said prism and rotatable therewith, said shade effective to mask from said prism light totally reflectable by said prism while admitting light that is refracted by said prism and directed to said object lens;
   whereby light from some of the characterizing features of an object is dispersed into its spectral colors and recorded on color film in said camera together with light from other characterizing features that appears undispersed.

2. The combination of claim 1 wherein said object lens is of the zoom type whereby focal length adjustment of said lens is effective to control the magnitude on the film of the images of the spectral separations effected by said prism.

3. The combination of claim 1 with the addition of means mounting said prism in said movable component for adjustment of the angle between said other prism face and the plane normal to the axis of said lens whereby representational characteristics of the object are distorted in controlled manner.

4. Photographic apparatus for creating colored photographs embodying controlled chromatic and representational characteristics of an object comprising:
   a camera including an object lens;
   a stationary component receiving the forward end of said lens;
   a movable component mounted for rotation on said stationary component on an axis generally colinear with the lens axis;

a prism mounted on said movable component adjacent said lens, the axis of said lens intersecting one prism face in the central region thereof, the other prism face approximately normal to the axis of said lens; and a shade disposed forwardly and laterally of said prism and rotatable therewith, said shade effective to mask from said prism light totally reflectable by said prism while admitting light that is refracted by said prism and directed to said object lens;

whereby light from some of the characterizing features of an object is dispersed into its spectral colors and recorded on color film in said camera together with light from other characterizing features that appears undispersed.

5. The combination of claim 4 wherein said object lens is of the zoom type whereby focal length adjustment of said lens is effective to control the magnitude on the film of the images of the spectral separations effected by said prism.

6. The combination of claim 4 with the addition of means mounting said prism in said movable component for adjustment of the angle between said other prism face and the plane normal to the axis of said lens whereby representational characteristics of the object are distorted in controlled manner.

7. The combination of claim 4 wherein said movable component includes an annular member mounted for rotation on said stationary member, said annular member having (1) an elongated portion holding a prism portion, (2) a pair of spaced post portions holding other prism portions and providing a pivotal axis for said prism and (3) a pair of spaced arms holding said shade.

8. The photographic method of creating colored photographs embodying controlled chromatic and representational characteristics of an object comprising the following steps:

locating a camera having an object lens of selected focal length at selected distance from an object having illumination of desired chromatic quality;

disposing a refracting and dispersing prism adjacent the object lens in position to refract light from the object into the lens;

shielding the prism to exclude totally reflectable light;

directing the optic axis of the lens-prism system at the object whereby light from the object enters the prism and is refracted and directed by the prism into the lens; and exposing in the camera a color film with light from the object.

References Cited

UNITED STATES PATENTS

| | | | |
|---|---|---|---|
| 1,732,848 | 10/1929 | Lapensee | 88—145 X |
| 1,988,390 | 1/1935 | Naumann | 95—45 |
| 2,179,657 | 11/1939 | Estey | 95—11 |
| 2,360,322 | 10/1944 | Harrison | 95—18 X |

JOHN M. HORAN, *Primary Examiner.*